United States Patent
Murakami et al.

(10) Patent No.: US 6,606,549 B1
(45) Date of Patent: Aug. 12, 2003

(54) FOR A FOUR-WHEEL-DRIVE VEHICLE

(75) Inventors: Tsuyoshi Murakami, Handa (JP); Ryohei Shigeta, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/658,487

(22) Filed: Sep. 8, 2000

(30) Foreign Application Priority Data

Sep. 8, 1999 (JP) ............................................. 11-254192
Sep. 8, 1999 (JP) ............................................. 11-254193

(51) Int. Cl.[7] .......................... B60T 7/12; G06F 17/00; B60K 41/04; B60K 41/02
(52) U.S. Cl. ............................ 701/89; 701/88; 701/90; 701/92; 180/248; 180/249; 457/257; 477/35; 477/80; 477/84; 477/85; 477/904
(58) Field of Search ............................. 701/88, 89, 90, 701/92; 180/248, 249, 233, 245, 246, 24.09; 73/514.16, 514.27, 514.31, 514.39; 457/257; 477/35, 80, 84, 85, 904

(56) References Cited

U.S. PATENT DOCUMENTS 4,866,625 A  * 9/1989  Kawamoto et al. ........... 701/89
5,752,211 A  * 5/1998  Takasaki et al. .............. 701/69
6,147,487 A  * 11/2000 Sugitani ................. 324/207.21

FOREIGN PATENT DOCUMENTS

| JP | 7-29558 | 4/1995 |
| JP | 7-172204 | 7/1995 |
| JP | 8-207605 | 8/1996 |
| JP | 8-207606 | 8/1996 |

* cited by examiner

*Primary Examiner*—Jacques H. Louis-Jacques
*Assistant Examiner*—Brian J. Broadhead
(74) *Attorney, Agent, or Firm*—Oblon, Spivak, McClelland, Maier & Neustadt, P.C.

(57) ABSTRACT

A drive-force distribution controller for a four-wheel-drive vehicle in which drive force produced by an engine is transmitted directly to front or rear wheels and is transmitted to the remaining wheels via a torque distribution clutch, and the engagement force of the torque distribution clutch is controlled in accordance with traveling conditions of the vehicle. The controller includes a calculation unit for calculating variation per unit time in rotational speed difference between the front wheels and the rear wheels; and a control unit for controlling the engagement force such that the engagement force increases as the variation per unit time in the rotational speed difference increases. Alternatively, the controller includes a first judgment unit for judging which is greater, the rotational speed of the front wheels or the rotational speed of the rear wheels; and a second judgment unit which is enabled when the first judgment unit has judged that the rotational speed of the front wheels is greater than the rotational speed of the rear wheels, in order to judge whether the acceleration of the vehicle is greater than a predetermined level. The engagement force of the torque distribution clutch is controlled in accordance with results of the judgments performed by the first and second judgment units.

11 Claims, 12 Drawing Sheets

FOR A FOUR-WHEEL-DRIVE VEHICLE

BACKGROUND OF THE INVENTION

1. Field of the Invention

The present invention relates to a drive-force distribution controller for a four-wheel-drive vehicle, and more particularly to a drive-force distribution controller for a four-wheel-drive vehicle which can distribute proper drive forces to front and rear wheels in accordance with traveling conditions of a vehicle to thereby improve traveling stability and steering feel.

2. Description of the Related Art

Conventionally, there has been known a drive-force distribution controller for a four-wheel-drive vehicle which variably controls the engagement force of a torque distribution clutch in accordance with the difference in rotational speed between front and rear wheels. FIG. 1 shows an exemplary control map used in such a drive-force distribution controller for a four-wheel-drive vehicle. In FIG. 1, the vertical axis represents engagement force T, and the horizontal axis represents rotational speed difference $\Delta N$ between front and rear wheels.

At the time of acceleration and starting on a so-called low-$\mu$ road such as a snow-covered road or an icy road, acceleration or starting can be effected in a stable manner if the engagement force T is rendered large at the time of acceleration or starting through employment of a mapping curve B indicated by a chain line in FIG. 1.

However, increased engagement force makes it difficult to absorb a rotational speed difference produced between the front and rear wheels while a vehicle travels around a tight corner or is being parked or put into a garage with a large steering angle, resulting in occurrence of a so-called tight-corner braking phenomenon (in which turning becomes difficult as if brakes were being applied), and possible stalling of the engine.

This problem may be solved though employment of the mapping curve B which sharply increases the engagement force as the rotational speed difference $\Delta N$ increases, and a mapping curve C which moderately increases the engagement force as the rotational speed difference $\Delta N$ increases as shown in FIG. 1. These mapping curves B and C are selectively used depending on whether the rotational speed difference $\Delta N$ between the front and rear wheels is produced due to starting of the vehicle on a low-$\mu$ road or acceleration, or due to traveling around a tight corner. However, it has been difficult to judge whether the rotational speed difference $\Delta N$ between the front and rear wheels is produced due to starting of the vehicle on a low-$\mu$ road or acceleration, or due to traveling around a tight corner. In order to solve this difficulty, there has been proposed a technique in which steering angle is detected by use of a steering angle sensor, and when a steering angle greater than a predetermined value is detected, a vehicle is judged to be traveling around a tight corner or in a tight-corner traveling mode. Further, there has been proposed a technique in which the amount by which an accelerator is depressed is detected by use of an accelerator sensor, and when an accelerator depression amount greater than a predetermined value is detected, the vehicle is judged to be accelerating or in an acceleration mode.

However, provision of the steering sensor and the accelerator sensor increases cost, which is undesirable.

Therefore, when use of the steering sensor and the accelerator sensor must be avoided, the conventional drive-force distribution controller for a four-wheel-drive vehicle uses a mapping curve A which is shown by a solid line in FIG. 1 and which has a slope between that of the mapping curve B, which sharply increases the engagement force with increase in the rotational speed difference $\Delta N$, and that of the mapping curve C, which moderately increases the engagement force with increase in the rotational speed difference $\Delta N$.

However, since the mapping curve A used in the conventional drive-force distribution controller for a four-wheel-drive vehicle is between the mapping curves B and C, a large engagement force cannot be obtained at the time of starting on a low-$\mu$ road or at the time of acceleration, so that wheels which receive the distributed drive force easily slip or spin out. Further, the above-mentioned tight-corner braking phenomenon easily occurs when the vehicle travels around a tight corner at low speed or is parked or put into a garage.

That is, the conventional drive-force distribution controller for a four-wheel-drive vehicle cannot determine whether a rotational speed difference $\Delta N$ is produced between the front and rear wheels due to either acceleration or starting, or due to traveling around a tight corner, and therefore cannot finely control the engagement force of the torque distribution clutch in accordance with the traveling conditions of the four-wheel-drive vehicle. Accordingly, the drive-force distribution controller cannot improve traveling stability and steering feel.

SUMMARY OF THE INVENTION

In view of the foregoing, an object of the present invention is to provide a drive-force distribution controller for a four-wheel-drive vehicle which can finely control the engagement force of a torque distribution clutch in accordance with the traveling conditions of the four-wheel-drive vehicle to thereby improve traveling stability and steering feel.

The present invention provides a drive-force distribution controller for a four-wheel-drive vehicle in which drive force produced by a prime mover is transmitted directly to front or rear wheels and is transmitted to the remaining wheels via a torque distribution clutch, and the engagement force of the torque distribution clutch is controlled in accordance with traveling conditions of the vehicle. The drive-force distribution controller comprises a calculation unit for calculating variation per unit time in rotational speed difference between the front wheels and the rear wheels; and a control unit for controlling the engagement force such that the engagement force increases as the variation per unit time in the rotational speed difference increases.

The calculation unit calculates variation per unit time in the rotational speed difference between the front wheels and the rear wheels; i.e., acceleration of the rotational speed difference. The acceleration of the rotational speed difference becomes large when the vehicle starts on a low-$\mu$ road, such as a snow-covered road or an icy road, or starts abruptly, and becomes small when the vehicle travels around a tight corner or is parked or put into a garage with a large steering angle.

The control unit controls the torque distribution clutch such that the engagement force increases as the variation per unit time in the rotational speed difference increases, as calculated by the calculation unit.

In other words, the control unit increases the engagement force when the vehicle starts on a low-$\mu$ road, such as a snow-covered road or an icy road, or starts abruptly, because the acceleration of the rotational speed difference becomes large in such a state.

Accordingly, the ratio of distribution of drive force to wheels which are not connected directly to the prime mover (i.e., wheels which receive a portion of the drive force) can be increased, which enables stable starting and acceleration while preventing slippage of the wheels.

In contrast, the control unit decreases the engagement force when the vehicle travels around a tight corner or is parked or put into a garage with a large steering angle, because the acceleration of the rotational speed difference becomes small in such a state.

Accordingly, the rotational speed difference between the front and rear wheels can be absorbed, whereby occurrence of the above-mentioned tight-corner braking phenomenon can be prevented.

Preferably, the control unit controls the engagement force in accordance with the rotational speed difference, as well as variation per unit time in the rotational speed difference. More preferably, the control unit comprises a control map for determining the engagement force in accordance with the rotational speed difference and variation per unit time in the rotational speed difference.

Preferably, the drive force distribution controller further comprises a sensor for detecting the difference between rotational speed on the input side of the torque distribution clutch and rotational speed on the output side of the torque distribution clutch, and the calculation unit calculates variation per unit time in the rotational speed difference detected by the sensor.

More preferably, the sensor comprises first and second annular members which are disposed to rotate together with one of input-side and output-side members of the torque distribution clutch and which are provided with sensing teeth formed on their outer circumferential surfaces at a predetermined pitch such that a phase difference is provided between the teeth of the first annular member and the teeth of the second annular member; and a pair of sensing heads disposed to rotate together with the other of the input-side and output-side members of the torque distribution clutch and torque the sensing teeth of the first annular member and the sensing teeth of the second annular member, respectively.

The present invention further provides a drive-force distribution controller for a four-wheel-drive vehicle in which drive force produced by a prime mover is transmitted directly to front wheels and is transmitted to rear wheels via a torque distribution clutch, and the engagement force of the torque distribution clutch is controlled in accordance with traveling conditions of the vehicle. The drive-force distribution controller comprises a first judgment unit for judging which is greater; the rotational speed of the front wheels or the rotational speed of the rear wheels; a second judgment unit which is enabled when the first judgment unit has judged that the rotational speed of the front wheels is greater than the rotational speed of the rear wheels, in order to judge whether the acceleration of the vehicle is greater than a predetermined level; a first setting unit for setting the engagement force to a relatively large first value when the second judgment unit has judged that the acceleration of the vehicle is greater than the predetermined level; a second setting unit for setting the engagement force to a second value smaller than the first value when the second judgment unit has judged that the acceleration of the vehicle is not greater than the predetermined level; and a third setting unit for setting the engagement force to a third value smaller than the first value but greater than the second value when the first judgment unit has judged that the rotational speed of the front wheels is less than the rotational speed of the rear wheels.

The first judgment unit judges which is greater; the rotational speed of the front wheels or the rotational speed of the rear wheels.

The four-wheel-drive vehicle designed on the basis of front wheel drive in which the drive force generated by the prime mover is transmitted directly to the front wheels has the following characteristics. When the vehicle is in a tight-corner mode (when the vehicle travels at low speed around a tight corner, or is being parked or put into a garage) or in an acceleration mode (when the vehicle accelerates or when the vehicle starts on a low-$\mu$ road such as a snow-covered road or an icy road), the rotational speed of the front wheels becomes greater than that of the rear wheels (a forward-rotation mode). In contrast, when the vehicle in a reverse-rotation mode (when braking or engine brake is effected), the rotational speed of the rear wheels becomes greater than that of the front wheels. Therefore, it is possible to judge whether the vehicle is in the forward-rotation mode or the reverse-rotation mode through judgment as to which is greater, the rotational speed of the front wheels or the rotational speed of the rear wheels.

When the first judgment unit has judged that the rotational speed of the front wheels is greater than the rotational speed of the rear wheels, the second judgment unit judges whether the acceleration of the vehicle is greater than a predetermined level.

As described above, the forward-rotation mode includes two modes; i.e., the tight-corner mode and the acceleration mode. Since the acceleration of the vehicle in the tight-corner mode is smaller than that is the acceleration mode, it is possible to judge whether the vehicle is in the tight-corner mode or the acceleration mode through judgment as to whether the acceleration of the vehicle is greater than a predetermined level.

The first setting unit sets the engagement force to a relatively large first value when the second judgment unit has judged that the acceleration of the vehicle is greater than the predetermined level; i.e., when the vehicle is in the acceleration mode.

That is, when the vehicle starts on a low-$\mu$ road or accelerates at an acceleration greater than the predetermined level, the engagement force of the torque distribution clutch can be increased in order to increase the ratio of distribution to the rear wheels of the drive force generated by the prime mover. Therefore, starting and acceleration can be effected in a stable manner, while slippage of the front wheels is prevented.

The second setting unit sets the engagement force to a second value smaller than the first value when the second judgment unit has judged that the acceleration of the vehicle is not greater than the predetermined level.

That is, when the vehicle travels at low speed around a tight corner, or is parked or put into a garage, the engagement force of the torque distribution clutch can be decreased in order to absorb the rotational speed difference between the front and rear wheels. Thus, the above-described tight-corner braking phenomenon can be prevented.

Further, the third setting unit sets the engagement force to a third value smaller than the first value but greater than the second value when the first judgment unit has judged that the rotational speed of the front wheels is less than the rotational speed of the rear wheels.

That is, when the rotational speed of the rear wheels becomes greater than the rotational speed of the front wheels due to, for example, deceleration of the vehicle caused by means of braking or engine brake, the engagement force is set to the third value smaller than the first value but greater than the second value in order to prevent slippage of the front wheels to thereby improve traveling stability.

Preferably, each of the first to third setting units sets the engagement force in consideration of the rotational speed difference between the front and rear wheels. More preferably, each of the first to third setting units sets the engagement force by use of a control map.

The present invention further provides a drive-force distribution controller for a four-wheel-drive vehicle in which drive force produced by a prime mover is transmitted directly to rear wheels and is transmitted to front wheels via a torque distribution clutch, and the engagement force of the torque distribution clutch is controlled in accordance with traveling conditions of the vehicle. The drive-force distribution controller comprises a first judgment unit for judging which is greater; the rotational speed of the front wheels or the rotational speed of the rear wheels, a first setting unit for setting the engagement force to a relatively large first value when the first judgment unit has judged that the rotational speed of the front wheels is less than the rotational speed of the rear wheels; and a second setting unit for setting the engagement force to a second value smaller than the first value when the first judgment unit has judged that the rotational speed of the front wheels is greater than the rotational speed of the rear wheels, wherein the second value increases with the speed of the vehicle.

The first judgment unit judges which is greater, the rotational speed of the front wheels or the rotational speed of the rear wheels.

The four-wheel-drive vehicle designed on the basis of rear wheel drive in which the drive force generated by the prime mover is transmitted directly to the rear wheels has the following characteristics. When the vehicle is in an acceleration mode (when the vehicle accelerates or when the vehicle starts on a low-$\mu$ road such as a snow-covered road or an icy road), the rotational speed of the rear wheels becomes greater than that of the front wheels (a forward-rotation mode). In contrast, when the vehicle is in a reverse-rotation/tight-corner mode (when the vehicle travels at low speed around a tight corner, or is parked or put into a garage; or when braking or engine brake is effected), the rotational speed of the front wheels becomes greater than that of the rear wheels. Therefore, it is possible to judge whether the vehicle is in the forward-rotation mode or the reverse-rotation/tight-corner mode through judgment as to which is greater; the rotational speed of the front wheels or the rotational speed of the rear wheels.

The first setting unit sets the engagement force to a relatively large first value when the first judgment unit has judged that the rotational speed of the rear wheels is greater than the rotational speed of the front wheels; i.e., when the vehicle is in the acceleration mode.

That is, when the vehicle starts on a low-$\mu$ road or accelerates at an acceleration greater than the predetermined level the engagement force of the torque distribution clutch can be increased in order to increase the ratio of distribution to the front wheels of the drive force generated by the prime mover. Therefore, starting and acceleration can be effected in a stable manner, while slippage of the rear wheels is prevented.

When the first judgment unit has judged that the rotational speed of the front wheels is greater than the rotational speed of the rear wheels, the second setting unit sets the engagement force to a second value which is smaller than the first value and which increases with the speed of the vehicle.

That is, when the vehicle travels at low speed around a tight corner, or is being parked or put into a garage, the engagement force of the torque distribution clutch can be decreased in order to absorb the rotational speed difference between the front and rear wheels. Thus, the above-described tight-corner braking phenomenon can be prevented.

Further, when the rotational speed of the front wheels becomes greater than the rotational speed of the rear wheels due to, for example, deceleration of the vehicle caused by means of braking or engine brake, the engagement force is set to the second value which is smaller than the first value and which increases with the speed of the vehicle. Thus, slippage of the rear wheels is prevented to thereby improve traveling stability.

Preferably, each of the first and second setting units sets the engagement force in consideration of the rotational speed difference between the front and rear wheels. More preferably, each of the first and second setting units sets the engagement force by use of a control map.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

First Embodiment

Figure 1:
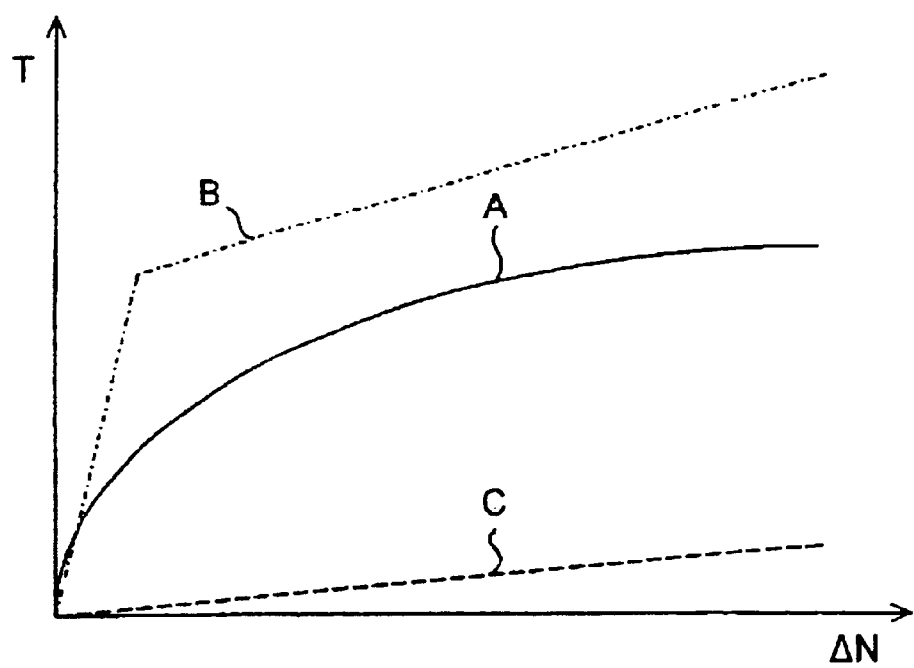
FIG. 1 is a graph showing an exemplary control map used in a conventional drive-force distribution controller for a four-wheel-drive vehicle.
Figure 2:
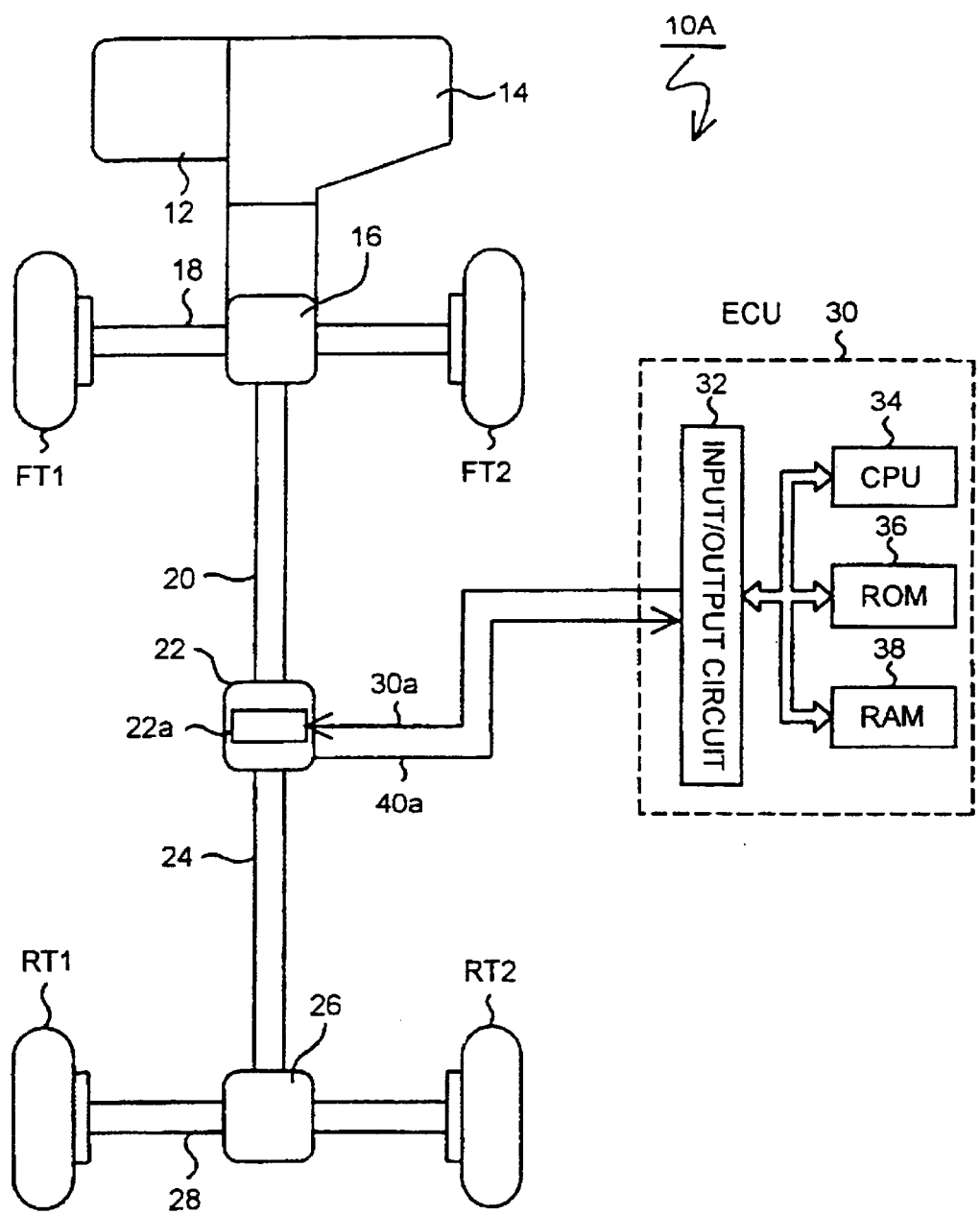
FIG. 2 is a diagram schematically showing the structure of a four-wheel-drive vehicle which is provided with a drive-force distribution controller according to a first embodiment of the present invention.

FIG. 2 is a diagram schematically showing the structure of a four-wheel-drive vehicle which is provided with a drive-force distribution controller according to a first embodiment of the present invention. In the first embodiment, a description will be given while a four-wheel-drive vehicle which is designed on the basis of front wheel drive is taken as an example.

Basic Structure

A drive force (drive power) generated by an engine 12 mounted on a four-wheel-drive vehicle 10A is transmitted from a transmission 14 to a front differential gear 16 and is further transmitted to front axle shafts 18 connected to the front differential gear 16, whereby front wheels FT1 and FT2 connected to the front axle shafts 18 are driven. Further, the drive force transmitted to the front differential gear 16 is transmitted to a first drive shaft 20 connected to the front differential gear 16 and then to a coupling 22 connected to the first drive shaft 20. A second drive shaft 24 is connected to the coupling 22. The coupling 22 includes an electromagnetic clutch 22 composed of a plurality of clutch disks.

When the plurality of clutch disks of the coupling 22 are brought into an engaged state, rotational torque of the first drive shaft 20 is transmitted to the second drive shaft 24 connected to the coupling 22. Rotational torque of the second drive shaft 24 is transmitted to a rear differential gear 26 and then to rear axle shafts 28 connected to the rear differential gear 26, whereby rear wheels RT1 and RT2 connected to the rear axle shafts 28 are driven.

Sensor Structure

Figure 3A:
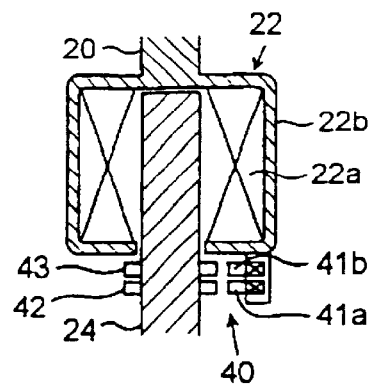
FIG. 3A is a sectional view of a sensor.
Figure 3B:
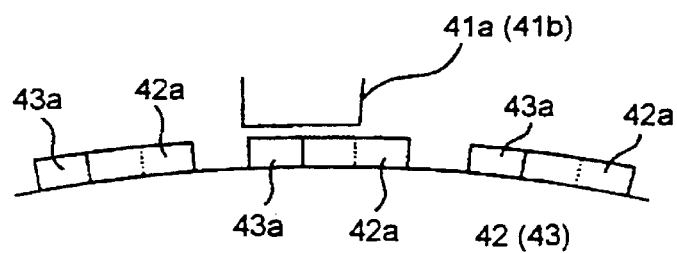
FIG. 3B is an enlarged view of sensing teeth provided on the outer circumferential surfaces of annular members shown in FIG. 3A.
Figure 3C:
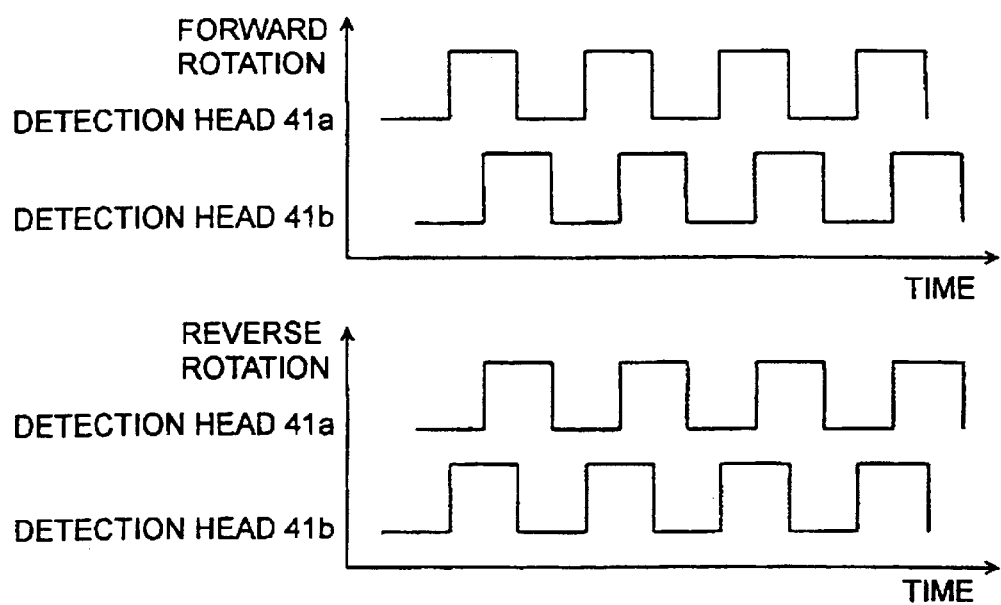
FIG. 3C shows time charts of signals output from the sensor shown in FIG. 3A.

Next, the structure of a sensor 40 for detecting rotational speed difference between the first and second drive shafts 20 and 24 will be described with reference to FIGS. 3A to 3C, wherein FIG. 3A is a sectional view of the sensor 40; FIG. 3B is an enlarged view of sensing teeth provided on the outer circumferential surfaces of annular members shown in FIG. 3A; and FIG. 3C shows time charts of signals output from the sensor 40 shown in FIG. 3A.

As shown in FIG. 3A, the coupling 22 has a coupling case 22b connected to the first drive shaft 20. The second drive shaft 24 is inserted into the coupling case 22b, and rotational torque of the first drive shaft 20 is transmitted to the second drive shaft 24 via the electromagnetic clutch 22a. Annular members 42 and 43 each made of a magnetic material are coaxially attached on the circumferential surface of the second drive shaft 24.

As shown in FIG. 3B, a plurality of sensing teeth 42a of uniform length and height are provided on the outer circumferential surface of the annular member 42 at uniform pitch. A plurality of sensing teeth 43a having the same size and shape as those of the sensing teeth 42a are provided on the outer circumferential surface of the annular member 43 at uniform pitch such that the sensing teeth 43a are shifted from the sensing teeth 42a by a half pitch. That is, each sensing tooth 43a overlaps with the corresponding sensing tooth 42a over a distance corresponding to half the tooth length. Detection heads 41a and 41b each including a coil are attached onto the outer surface of the coupling case 22b at locations that face the annular members 42 and 43, respectively. The annular members 42 and 43 and the detection heads 41a and 41b constitute the sensor 40.

The detection heads 41a and 41b are in contact with illustrated slip rings serving as signal pickup means, and the detection heads 41a and 41b output detection signals via the slip rings. The detection signals are pulse signals as shown in FIG. 3C, and the period (interval) of the pulse signals corresponds to the interval at which the sensing teeth 42a and 43a are detected.

When a rotational speed difference $\Delta N$ is produced between the first and second drive shafts 20 and 24, the rotational speed difference $\Delta N$ is detected through detection of the period of the pulse signals. Variation in the rotational speed difference $\Delta N$ per unit time; i.e., acceleration $\alpha$, can be obtained through calculation of variation in the period of the pulse signals per unit time. The calculation of the period and acceleration $\alpha$ is performed by a CPU 34 provided in an ECU 30 (see FIG. 2).

As described above, each of the sensing teeth 42a provided on the annular member 42 overlaps with a corresponding one of the sensing teeth 43a provided on the annular member 43 over a distance corresponding to half the tooth length. Therefore, when the direction of relative rotation between the first and second drive shafts 20 and 24 changes, the phase relationship between the pulse signals output from the detection heads 41a and 41b changes. Here, it is assumed that forward rotation is relative rotation in such a direction that the phase of the detection signal from the detection head 41a leads by half a period the phase of the detection signal from the detection head 41b, as shown in FIG. 3C. Therefore, when the direction of relative rotation between the first and second drive shafts 20 and 24 is changed from the forward direction to the reverse direction, the phase of the detection signal from the detection head 41a lags by half a period the phase of the detection signal from the detection head 41b.

The CPU 34 compares the phase of the detection signal output from the detection head 41a and the phase of the detection signal output from the detection head 41b and judges which one leads the other, to thereby judge whether the detected relative rotation is forward rotation or reverse rotation.

Electrical Configuration

As shown in FIG. 2, the four-wheel-drive vehicle 10A is equipped with the ECU 30, which controls the coupling 22 and other components. The ECU 30 includes an input/output circuit 32, the above-mentioned CPU 34, ROM 36, and RAM 38. The input/output circuit 32 inputs detection signals output from the sensor 40 and outputs a control signal to the coupling 22. Upon reception of the control signal, the coupling 22 operates the electromagnetic clutch 22a and controls the engagement force produced among the plurality of clutch disks in accordance with the voltage of the control signal.

As described above, the CPU 34 inputs a signal (hereinafter referred to as a "rotational speed difference signal") 40a representing the rotational speed difference ΔN between the first and second drive shafts 20 and 24 detected by the sensor 40, and calculates variation in the rotational speed difference ΔN per unit time; i.e., acceleration α and direction of relative rotation between the first and second drive shafts 20 and 24.

The ROM 36 stores various control maps and a computer program which enables the CPU 34 to perform various types of controls. The RAM 38 temporarily stores a computer program to be executed by the CPU 34 and results of calculations performed by the CPU 34.

Next, engagement-force control maps to which the CPU 34 refers during execution of the computer program for controlling the coupling 22 will be described with reference to FIGS. 4A, 4B, 5A, and 5B.

In the following description, when the rotational speed difference ΔN>0, the vehicle is considered to be in a forward-rotation mode, and when the rotational speed difference ΔN<0, the vehicle is considered to be in a reverse-rotation mode.

Figure 4A:
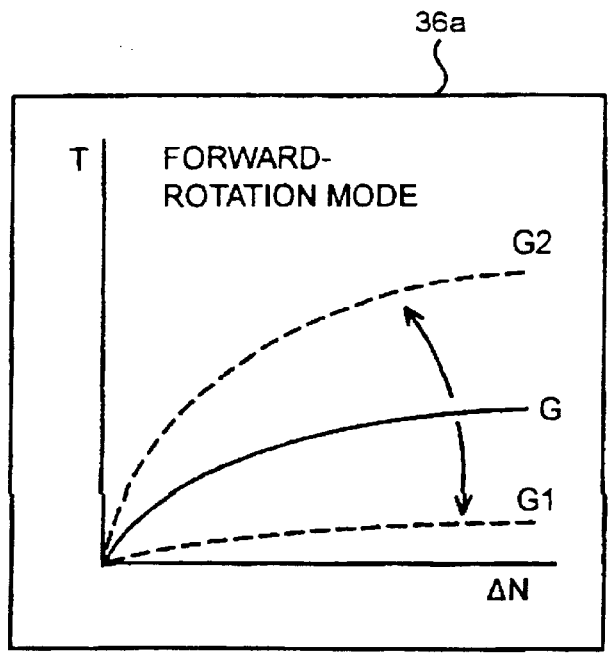
FIGS. 4A and 4B are graphs showing engagement-force control maps to which a CPU refers in order to control a coupling shown in FIG. 2.
Figure 4B:
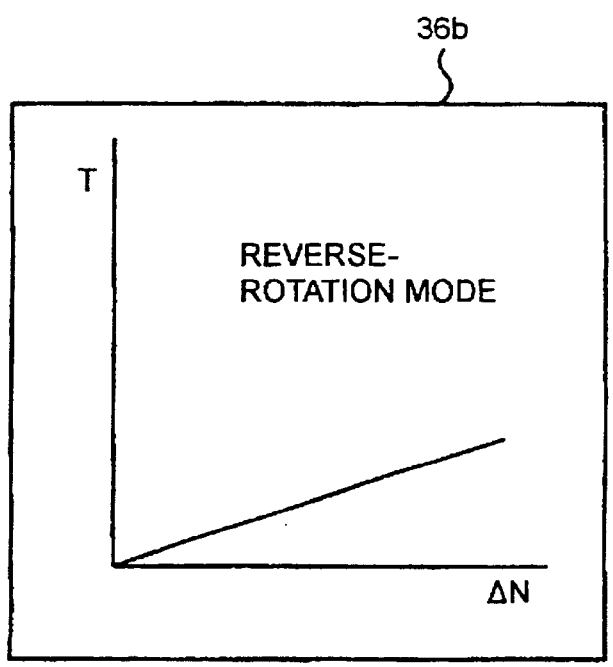
Figure 5A:
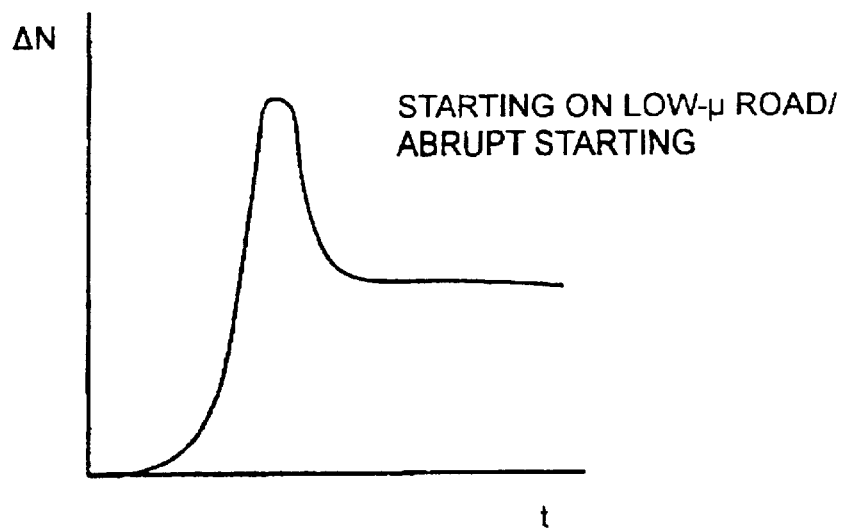
FIG. 5A is a graph showing the relationship between time and rotational speed difference between front and rear wheels at the time of starting on a low-$\mu$ road or at the time of abrupt starting.
Figure 5B:
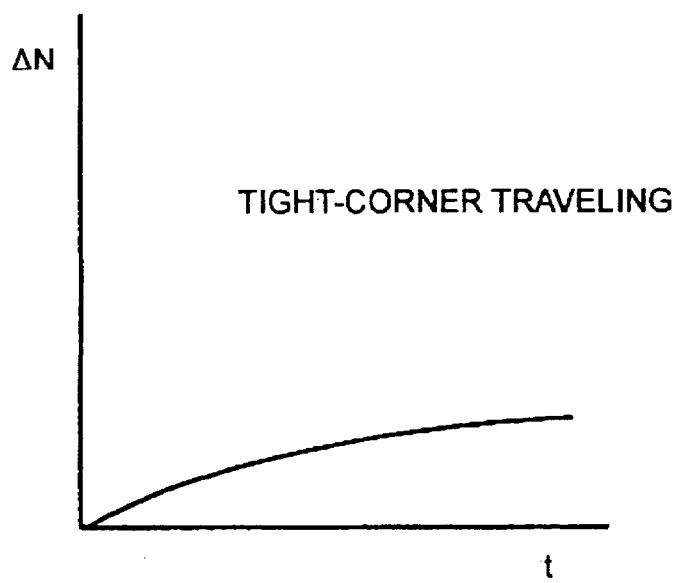
FIG. 5B is a graph showing the relationship between time and rotational speed difference between front and rear wheels at the time a vehicle travels at low speed with a large steering angle, such as when traveling around a tight corner.

FIGS. 4A and 4B show engagement-force control maps to which the CPU 34 refers during execution of the computer program for controlling the coupling 22, wherein FIG. 4A shows a forward-rotation-mode map used in the forward-rotation mode, and FIG. 4B shows a reverse-rotation-mode map used in the reverse-rotation mode. FIG. 5A is a graph showing the relationship between time T and the rotational speed difference ΔN between front and rear wheels at the time of starting on a low-μ road or at the time of abrupt starting. FIG. 5B is a graph showing the relationship between time T and the rotational speed difference ΔN between front and rear wheels at the time a vehicle travels at low speed with a large steering angle, such as while traveling around a tight corner.

As shown in FIG. 5A, at the time of starting on a low-μ road or at the time of abrupt starting, since drive force is transmitted directly to the front wheels, the front wheels slip and spin out, with the result that the rotational speed difference ΔN between front and rear wheels increases abruptly immediately after initiation of movement. Further, as shown in FIG. 5B, at the time of tight-corner traveling, the rotational speed difference ΔN increases gradually after initiation of the tight-corner traveling. Through comparison of FIGS. 5A and 5B, it is understood that variation in the rotational speed difference ΔN per unit time; i.e., acceleration at the time of starting on a low-μ road or abrupt starting, differs from that at the time of tight-corner traveling.

In view of the forgoing, the present inventors found that detection of acceleration of the rotational speed difference ΔN enables the state in which the vehicle 10A starts on a low-μ road or starts abruptly to be distinguished from the state in which the vehicle 10A travels around a tight corner. On the basis of this finding, the present inventors have invented means for finely controlling the engagement force through changeover of engagement-force control maps in accordance with the acceleration of the rotational speed difference ΔN.

The engagement-force control maps include the forward-rotation-mode map 36a shown in FIG. 4A and the reverse-rotation-mode map 36b shown in FIG. 4B. In FIGS. 4A and 4B, the horizontal axis represents rotational speed difference ΔN, and the vertical axis represents engagement force T. The forward-rotation-mode map 36a includes a plurality of maps having different characteristics corresponding to different gains which are determined on the basis of the acceleration of the rotational speed difference ΔN.

When the vehicle 10A starts on a low-μ road such as a snow-covered road or an icy road or the vehicle 10A starts abruptly, the acceleration α is large (e.g., gain G2 is selected), so that the engagement force T is controlled to increase.

Accordingly, the ratio of distribution of drive force to the rear wheels RT1 and RT2 can be increased, whereby starting and acceleration can be effected in a stable manner, while slippage and spinning out of the front wheels FT1 and FT2 are prevented.

When the vehicle 10A travels around a tight corner or the vehicle 10A is parked or put into a garage with a large steering angle, the acceleration α of the rotational speed difference ΔN is small (e.g., gain G1 is selected), so that the engagement force T is controlled to decrease.

Accordingly, the rotational speed difference ΔN between the front and rear wheels can be absorbed, so that the above-described tight-corner braking phenomenon can be prevented.

The reverse-rotation-mode map 36b is an engagement-force control map used when the rotational speed difference ΔN<0; i.e., when the rotational speed of the rear wheels becomes greater than that of the front wheels due to, for example, deceleration caused by means of braking or engine brake. The ratio of increase in the engagement force T to increase in the rotational speed difference ΔN is an intermediate value which is larger than that in the map for gain G1 but is smaller than that in the map for gain G2.

That is, when the vehicle 10A is decelerated through braking or engine brake, the engagement force T is controlled to an intermediate level. Thus, slippage of the wheels is prevented to thereby enhance traveling stability.

Figure 6:
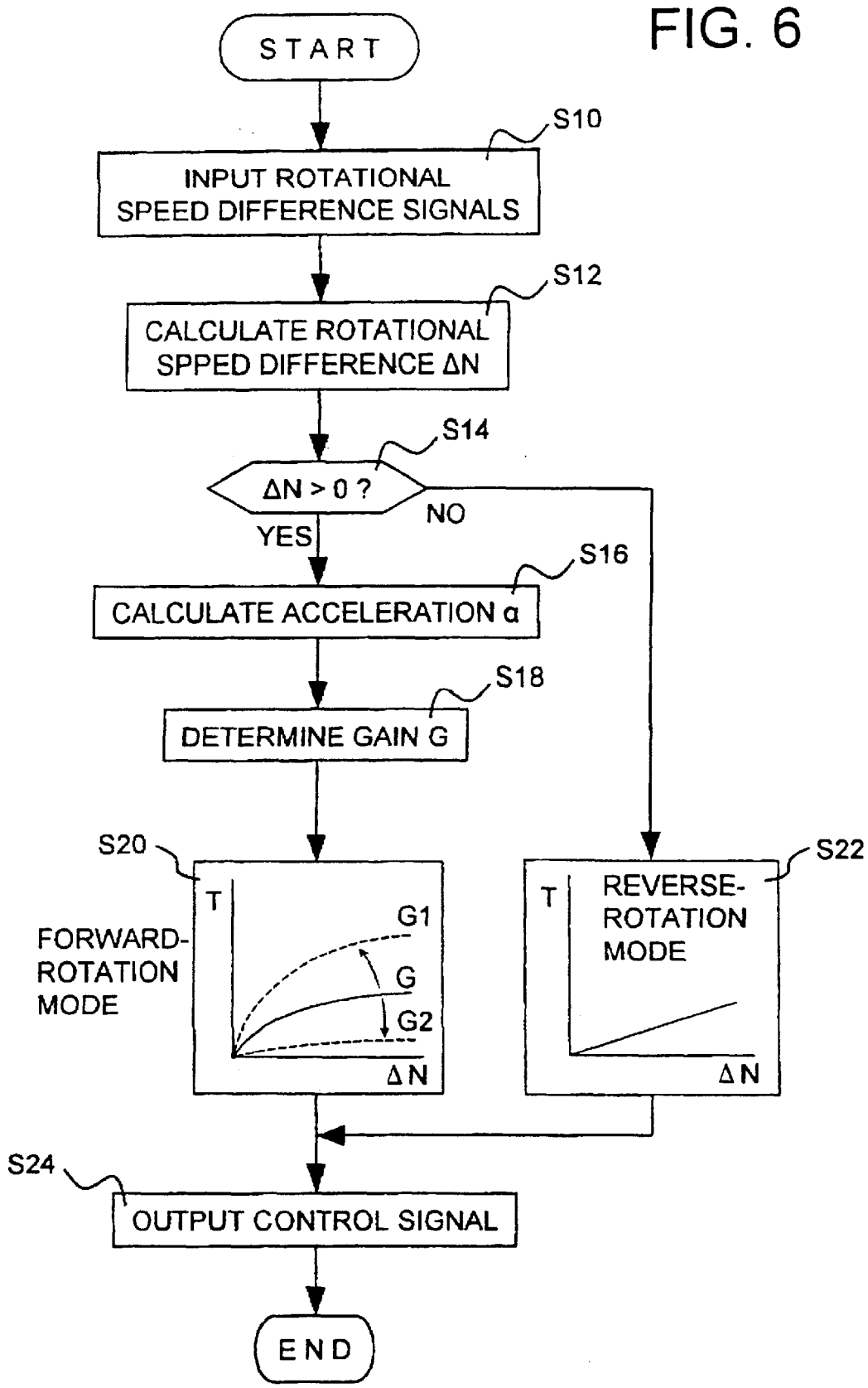
FIG. 6 is a flowchart showing the flow of processing which the CPU performs in order to control the engagement force of the coupling in the first embodiment.

Next, the flow of processing that the CPU 34 executes in order to control the engagement force T will be described with reference to the flowchart of FIG. 6.

The CPU 34 inputs the rotational speed difference signals 40a output from the sensor 40 (step (hereinafter abbreviated to "S") 10) and calculates the rotational speed difference ΔN on basis of the rotational speed difference signals 40a (S12). When the rotational speed difference signals 40a are periodic signals, the period of the signals is measured, and the rotational speed difference ΔN is calculated on basis of the measured period.

Subsequently, the CPU 34 judges whether the rotational speed difference ΔN calculated in S12 is positive or negative (S14). When the rotational speed difference ΔN is positive (S14:Yes), the CPU 34 differentiates the rotational speed difference ΔN in order to obtain an acceleration α of the rotational speed difference ΔN (S16). Subsequently, the CPU 34 determines a gain G corresponding to the acceleration α calculated in S16 (S18). The larger the acceleration α, the larger the gain G that is determined. That is, when the front wheels of the vehicle 10A are slipping and spinning out at the time of starting on a low-μ road or at the time of abrupt starting, the acceleration α is large, and therefore the gain G is set to be large. When the vehicle 10A travels at low speed with a large steering angle; e.g., travels around a tight corner, the acceleration α is small, and therefore the gain G is set to be small.

Subsequently, while referring to the forward-rotation-mode map 36a stored in the ROM 36, the CPU 34 selects a map corresponding to the gain G determined in S18, and extracts from the selected map an engagement force T corresponding to the rotational speed difference ΔN calculated in S12 (S20). Subsequently, the CPU 34 outputs to the coupling 22 a control signal 30a having a voltage corresponding to the engagement force T determined in S20 (S24).

When the rotational speed difference ΔN is negative; i.e., when the vehicle is in the reverse-rotation mode (S14:No), while referring to the reverse-rotation-mode map 36b stored in the ROM 36, the CPU 34 extracts an engagement force T corresponding to the rotational speed difference ΔN calculated in S12 (S22). Subsequently, the CPU 34 outputs to the coupling 22 a control signal 30a having a voltage value corresponding to the engagement force T determined in S22 (S24). As described above, the reverse-rotation-mode map 36b is set such that the ratio of increase in the engagement force T to increase in the rotational speed difference ΔN becomes an intermediate value which is larger than that in the map for gain G1 but smaller than that in the map for gain G2 in the forward-rotation-mode map 36a. Therefore, the engagement force T can be controlled to an intermediate level corresponding to the rotational speed difference ΔN. When the rotational speed of the front wheels FT1 and FT2 decreases due to engine brake, the vehicle 10A is forced by inertia to continue its traveling, so that the front wheels FT1 and FT2 easily slip and spin out. In view of this problem, drive torque is distributed to the rear wheels RT1 and RT2. However, when an excessively large drive torque is supplied to the rear wheels RT1 and RT2, on which smaller loads act as compared with the front wheels FT1 and FT2, the rear wheels RT1 and RT2 easily slip and spin out, which deteriorates steering stability. Therefore, the engagement torque T is controlled to the above-described intermediate level.

That is, when the vehicle 10A is decelerated by means of braking or engine brake, a drive force corresponding to the degree of deceleration can be distributed to the rear wheels. Therefore, slippage of wheels can be prevented to thereby enhance traveling stability.

In the case of a vehicle on which an anti-lock brake system (ABS) is mounted, in order to avoid interference with ABS control, a control program differing from that of the present invention is executed when the ABS system operates.

As described above, when the drive-force distribution controller for a four-wheel-drive vehicle according to the first embodiment is used, the engagement force of the torque distribution clutch can be controlled finely according to the traveling conditions of the four-wheel-drive vehicle 10A, by use of the acceleration α of rotational speed difference ΔN only. Therefore, traveling stability and steering feel can be improved without use of a steering sensor or an accelerator sensor. Further, since the engagement force T can be controlled through use of a single sensor 40, the number of sensors can be decreased as compared with conventional drive-force distribution controllers, in order to reduce production cost of the drive-force distribution controller. In addition, since the signals representing the rotational speed difference ΔN are input directly, the processing load of the CPU 34 can be reduced, so that an inexpensive processor can be used for the CPU 34, which further reduces production cost.

The drive force distribution controller for a four-wheel-drive vehicle according to the present embodiment can be applied to drive force distribution control for a four-wheel-drive vehicle designed on the basis of rear wheel drive.

In this case, the vehicle enters the forward rotation mode when the rotational speed of the second drive shaft 24 becomes greater than that of the first drive shaft 20 and thus the rotational speed difference ΔN becomes negative, and the vehicle enters the reverse rotation mode when the rotational speed difference ΔN becomes positive. That is, the inequality used for judgment in S14 in FIG. 6 is changed to "ΔN<0?". Further, since distribution of torque to the front wheels is controlled finely in S20 and S22, the traveling stability and steering feel can be improved. Further, since the engagement force T can be controlled through use of a single sensor 40, the number of sensors can be decreased as compared with conventional drive-force distribution controllers, in order to reduce production cost of the drive-force distribution controller. In addition, since the signals representing the rotational speed difference ΔN are input directly, the processing load of the CPU 34 can be reduced, so that an inexpensive processor can be used for the CPU 34, which further reduces production cost.

In the first embodiment, a map corresponding to the gain determined in S18 is selected, and an engagement force T corresponding to the rotational speed difference ΔN calculated in S12 is extracted from the selected map (S20). However, the first embodiment may be modified such that a single map is used to constitute the forward-rotation-mode map 36a, and a value extracted from the map is multiplied by the gain G to obtain the engagement force T.

Further, in the first embodiment, the sensor 40 is composed of the annular members 42 and 43 made of a magnetic material and the detection heads 41a and 41b each having a coil. However, a rotary encoder or any other suitable sensor may be used. When a rotary encoder is used, a light emission element of the encoder is attached to a member which rotates together with one of the first and second drive shafts 20 and 24, and a light reception element of the encoder is attached to a member which rotates together with the other of the first and second drive shafts 20 and 24.

When the drive-force distribution controller for a four-wheel-drive vehicle according to the present embodiment is applied to a vehicle equipped with ABS system, rotational speed difference ΔN and acceleration α may be calculated on the basis of the wheel speeds of the front and rear wheels which are obtained on the basis of signals output from wheel speed sensors provided for the front and rear wheels, respectively.

In the first embodiment, the engine 12 corresponds to the prime mover of the present invention; and the coupling 22 corresponds to the torque distribution clutch of the present invention. Further, S16 of the program executed by the CPU 34 serves as the calculation unit of the present invention, and S18 to S22 of the program serve as the control unit of the present invention.

Second Embodiment

Figure 7:
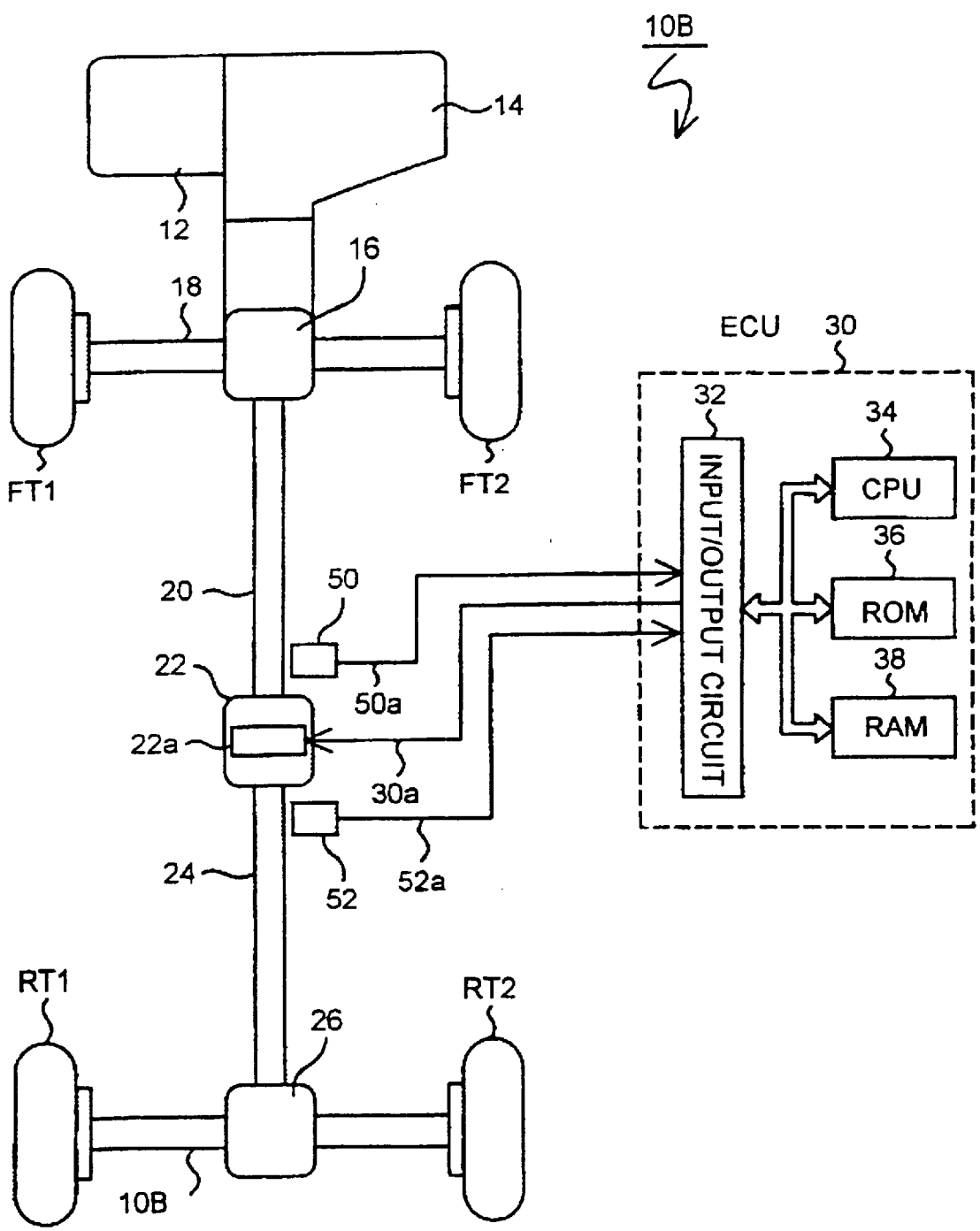
FIG. 7 is a diagram schematically showing the structure of a four-wheel-drive vehicle which is provided with a drive-force distribution controller according to a second embodiment of the present invention.

FIG. 7 shows the structure of a four-wheel-drive vehicle 10B which is provided with a drive-force distribution controller according to a second embodiment of the present invention. In the second embodiment, a description will be given, while a four-wheel-drive vehicle which is designed on the basis of front wheel drive is taken as an example.

Basic Structure

Since the basic structure of the four-wheel-drive vehicle 10B is similar to that of the four-wheel-drive vehicle 10A of the first embodiment, only a portion that differs will be described. The same or corresponding portions are denoted by the same reference numerals, and repeated descriptions are omitted.

In the present embodiment, first and second sensors 50 and 52 are used in place of the sensor 40 used in the first embodiment. The first sensor 50 is disposed in the vicinity of the first drive shaft 20 in order to detect the rotational speed of the first drive shaft 20, and the second sensor 52 is disposed in the vicinity of the second drive shaft 24 in order to detect the rotational speed of the second drive shaft 24.

Electrical Configuration

Since the electrical configuration of the four-wheel-drive vehicle 10B is similar to that of the four-wheel-drive vehicle 10A of the first embodiment, only a portion that differs will be described. The same or corresponding portions are denoted by the same reference numerals, and repeated descriptions are omitted.

As shown in FIG. 7, the input/output circuit 32 inputs detection signals output from the first and second sensors 50 and 52. The detection signal 50*a* from the first sensor 50 represents the rotational speed of the first drive shaft 20, i.e., the rotational speed N1 as measured on the input side of the coupling 22 (hereinafter referred to as "input rotational speed N1"), and the signal 50*a* representing the input rotational speed N1 will be called an "input rotational speed signal." The detection signal 52*a* from the second sensor 52 represents the rotational speed of the second drive shaft 24; i.e., the rotational speed N2 as measured on the output side of the coupling 22 (hereinafter referred to as "output rotational speed N2"), and the signal 52*a* representing the output rotational speed N2 will be called an "output rotational speed signal." The CPU 34 calculates the rotational speed difference ΔN between the input rotational speed N1 and the output rotational speed N2 on the basis of the input rotational speed signal and the output rotational speed signal.

Next, engagement-force control maps to which the CPU 34 refers during execution of the computer program for controlling the coupling 22 will be described with reference to FIGS. 8A, 8B, and 8C.

In the following description, when the input rotational speed N1>the output rotational speed N2, the vehicle is considered to be in a forward-rotation mode, and when the input rotational speed N1<the output rotational speed N2, the vehicle is considered to be in a reverse-rotation mode.

Figure 8A:
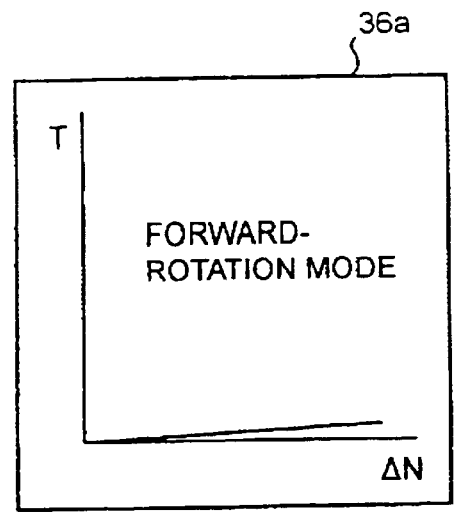
FIGS. 8A, 8B, and 8C are graphs showing engagement-force control maps to which the CPU refers in order to control a coupling shown in FIG. 7.
Figure 8B:
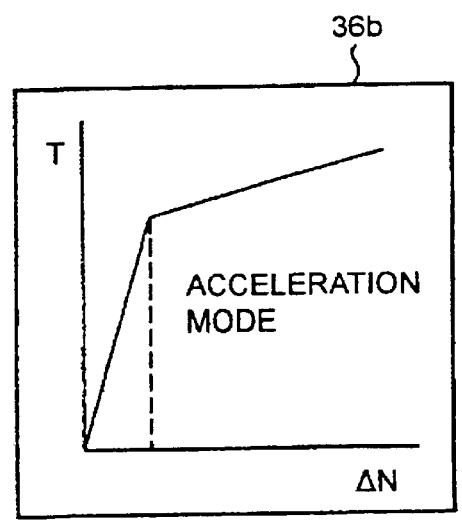
Figure 8C:
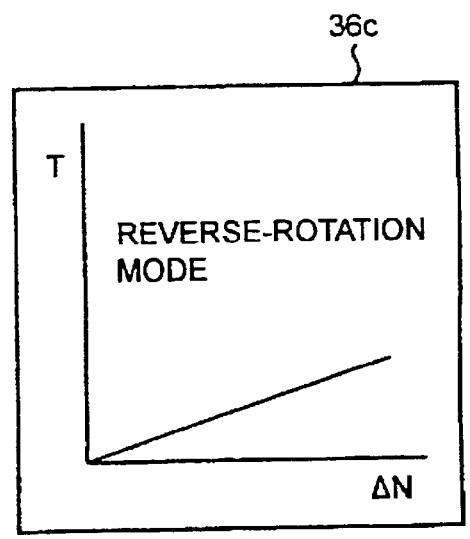

The engagement-force control maps include a tight-corner-mode map 36*a* shown in FIG. 8A, an acceleration-mode map 36*b* shown in FIG. 8B, and a reverse-rotation-mode map 36*c* shown in FIG. 8C.

The tight-corner-mode map 36*a* is an engagement-force control map which is used when the four-wheel-drive vehicle 10B turns at low speed; e.g., when the vehicle 10B is turned around a tight corner, is being parked, or is put into a garage. The tight-corner-mode map 36*a* has characteristics such that engagement force T increases moderately as the rotational speed difference ΔN increases.

That is, the tight-corner-mode map 36*a* is used when the vehicle 10B turns at low speed; in particular, when the vehicle 10B turns with a large steering angle. Use of the tight-corner-mode map 36*a* enables the engagement force T to be maintained relatively small even when the rotational speed difference ΔN increases during the turning. Thus, the above-described tight-corner braking phenomenon is prevented.

The acceleration-mode map 36*b* is an engagement-force control map which is used when the four-wheel-drive vehicle 10B starts on a low-μ road or accelerates at an acceleration greater than a predetermined level. The acceleration-mode map 36*b* has characteristics such that engagement force T increases sharply as the rotational speed difference ΔN increases when the rotational speed difference ΔN is relatively small (until the rotational speed difference ΔN reaches ΔNt), and the engagement force T increases moderately when the rotational speed difference ΔN is relatively large (after the rotational speed difference ΔN has reached ΔNt).

That is, when the four-wheel-drive vehicle 10B starts on a low-μ road or accelerates at an acceleration greater than the predetermined level, the engagement force T can be increased sharply, so that the ratio of distribution to the rear wheels of drive force generated by the engine can be increased. Thus, acceleration and starting are effected in a stable manner, while slippage of the front wheels is prevented.

The reverse rotation-mode map 36*c* is an engagement force control map used when the input rotational speed N1<the output rotational speed N2; i.e., when the rotational speed of the rear wheels becomes greater than that of the front wheels due to, for example, deceleration caused by means of braking or engine brake. The ratio of increase in the engagement force T to increase in the rotational speed difference ΔN is an intermediate value which is smaller than that in the acceleration-mode map 36*b* but larger than that in the tight-corner-mode map 36*a*.

That is, when the vehicle 10B is decelerated through braking or engine brake, the engagement force T is controlled to become an intermediate level. Thus, slippage of the front wheels is prevented to thereby enhance traveling stability.

Figure 9:
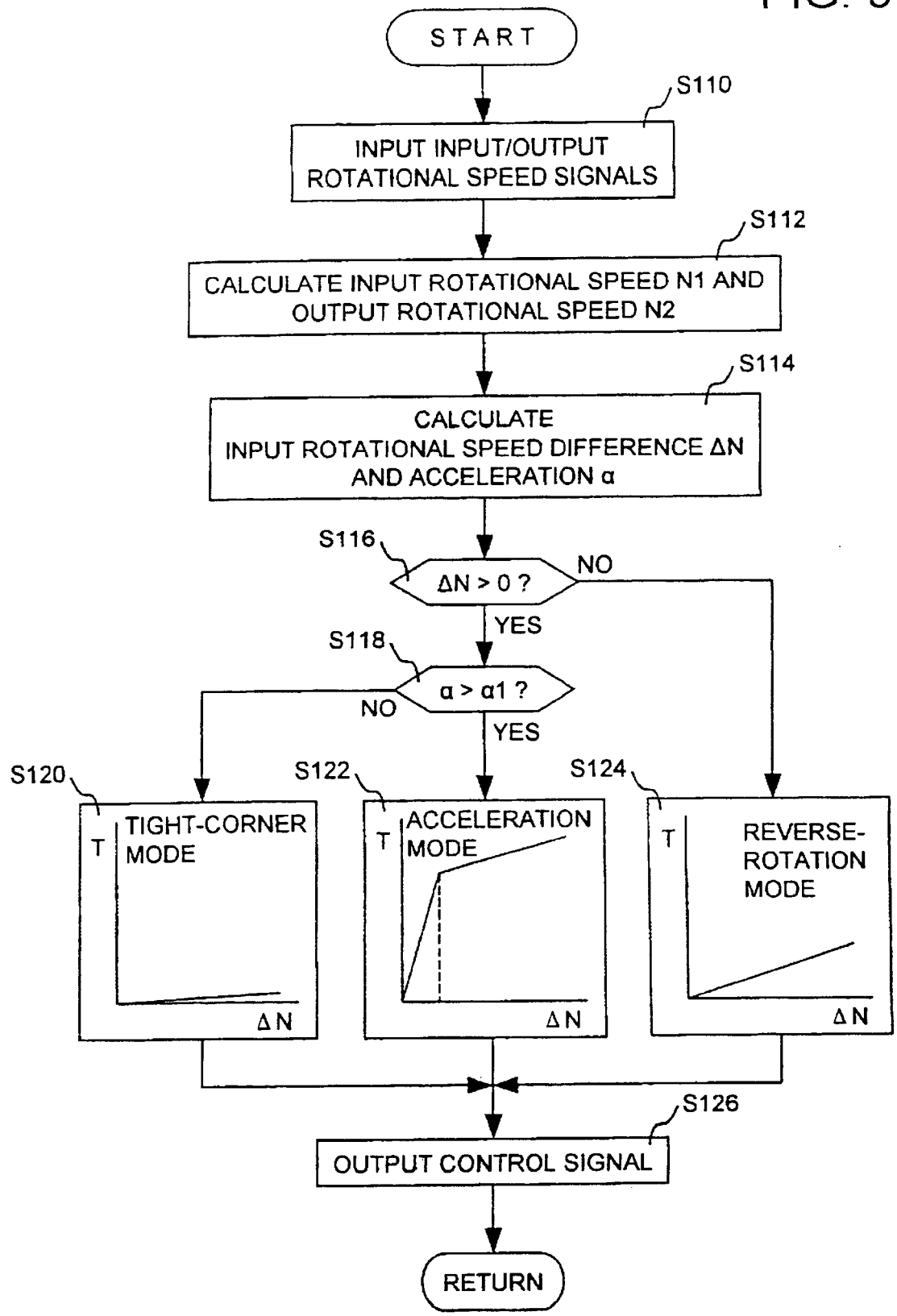
FIG. 9 is a flowchart showing the flow of processing which the CPU performs in order to control the engagement force of the coupling in the second embodiment.

Next, the flow of processing that the CPU 34 executes in order to control the engagement force T will be described with reference to the flowchart of FIG. 9.

The CPU 34 inputs the input rotational speed signal 50*a* output from the first sensor 50 and the output rotational speed signal 52*a* output from the second sensor 52 (S110). The CPU 34 then calculates the input rotational speed N1 on the basis of the input rotational speed signal 50*a* and calculates the output rotational speed N2 on the basis of the output rotational speed signal 52*a* (S112). When the input rotational speed signal 50*a* is a periodic signal, the period of the input rotational speed signal 50*a* is measured, and the input rotational speed N1 is calculated on the basis of the measured period. Similarly, when the output rotational speed signal 52*a* is a periodic signal, the period of the output rotational speed signal 52*a* is measured, and the output rotational speed N2 is calculated on the basis of the measured period.

Subsequently, the CPU 34 subtracts the output rotational speed N2 from the input rotational speed N1 to thereby obtain the rotational speed difference ΔN, and calculates the acceleration α of the four-wheel-drive vehicle 10B on the basis of increase in the output rotational speed N2 per unit time (S114). The reason why the acceleration α of the four-wheel-drive vehicle 10B is calculated on the basis of the output rotational speed N2 is that in the four-wheel-drive vehicle 10B, which is designed on the basis of front wheel drive, the front wheels easily spin out at the time of acceleration or starting, and therefore, the acceleration α cannot be calculated accurately from the input rotational speed N1, which represents the rotational speed of the first drive shaft 20 produced on the front wheel side.

Subsequently, the CPU 34 judges whether the rotational speed difference ΔN calculated in S114 is positive or negative (S116). When the rotational speed difference ΔN is positive (S116:Yes), the CPU 34 judges whether the acceleration α calculated in S114 is greater than a preset value α1 stored in the ROM 36; i.e., whether the four-wheel-drive vehicle 10B is in a tight-corner mode or an acceleration mode (S118).

When the acceleration α is less than the preset value α1; i.e., when the vehicle 10B is in the tight-corner mode (S118:No), while referring to the tight-corner-mode map 36a stored in the ROM 36, the CPU 34 extracts an engagement force T corresponding to the rotational speed difference ΔN calculated in S114 (S120). Subsequently the CPU 34 outputs to the coupling 22 a control signal 30a having a voltage value corresponding to the engagement force T determined in S120 (S126) In this case, since the tight-corner-mode map 36a is set such that the ratio of increase in the engagement force T to increase in the rotational speed difference ΔN is relatively small, the voltage of the control signal 30a output to the coupling 22 is relatively low.

Accordingly, the clutch disks of the electromagnetic clutch 22a engage with a relatively small engagement force, and thus a relatively small rotational torque is transmitted form the first drive shaft 20 to the second drive shaft 24, whereby the drive force of the rear wheels RT1 and RT2 can be decreased.

Thus, the above-described tight-corner braking phenomenona—which would otherwise occur due to excess distribution of torque to the rear wheels RT1 and RT2—can be prevented.

When the rotational speed difference ΔN is positive and the acceleration α is not less than the preset value α1; i.e., the vehicle 10B is in the acceleration mode (S118:Yes), while referring to the acceleration-mode map 36b stored in the ROM 36, the CPU 34 extracts an engagement force T corresponding to the rotational speed difference ΔN calculated in S114 (S122). Subsequently, the CPU 34 outputs to the coupling 22 the control signal 30a having a voltage value corresponding to the engagement force T determined in S122 (S126). In this case, since the acceleration-mode map 36b is set such that the engagement force T increases sharply even when the rotational speed difference ΔN is small, the voltage of the control signal 30a output to the coupling 22 is relatively high.

Accordingly, the clutch disks of the electromagnetic clutch 22a engage with a relatively large engagement force, and thus a relatively large rotational torque is transmitted form the first drive shaft 20 to the second drive shaft 24, whereby the drive force of the rear wheels RT1 and RT2 can be increased.

That is, since the ratio of distribution of torque to the rear wheels RT1 and RT2 can be increased, acceleration or starting is effected, while slippage of the front wheels FT1 and FT2 is prevented.

When the rotational speed difference ΔN is negative, i.e., when the vehicle is in the reverse-rotation mode (S116:No), while referring to the reverse-rotation-mode map 36c stored in the ROM 36, the CPU 34 extracts an engagement force T corresponding to the rotational speed difference ΔN calculated in S114 (S124). Subsequently, the CPU 34 outputs to the coupling 22 a control signal 30a having a voltage value corresponding to the engagement force T determined in S124 (S126). As described above, the reverse-rotation-mode map 36c is set such that the ratio of increase in the engagement force T to increase in the rotational speed difference ΔN becomes an intermediate value which is smaller than that in the acceleration-mode map 36b but larger than that in the tight-corner mode map 36a. Therefore, the engagement force T can be controlled to an intermediate level corresponding to the rotational speed difference ΔN.

When the rotational speed of the front wheels FT1 and FT2 decreases due to engine brake, the vehicle 10B is forced by inertia to continue its traveling, so that the front wheels FT1 and FT2 easily slip and spin out. In view of this problem, drive torque is distributed to the rear wheels RT1 and RT2. However, when an excessively large drive torque is supplied to the rear wheels RT1 and RT2, on which smaller loads act as compared with the front wheels FT1 and FT2, the rear wheels RT1 and RT2 easily slip and spin out, which deteriorates steering stability. Therefore, the engagement torque T is controlled to the above-described intermediate level.

That is, when the vehicle 10B is decelerated by means of braking or engine brake, a drive force corresponding to the degree of deceleration can be distributed to the rear wheels. Therefore slippage of wheels can be prevented to thereby enhance traveling stability.

In the case of a vehicle on which an anti-lock brake system (ABS) is mounted, in order to avoid interference with ABS control, a control program differing from that of the present invention is executed when the ABS system operates.

As described above, when the drive-force distribution controller for a four-wheel-drive vehicle according to the present embodiment is used, the engagement force of the torque distribution clutch can be controlled finely according to the traveling conditions of the four-wheel-drive vehicle 10B, by use of only the first and second sensors 40 and 42 for detection of rotational speed. Therefore, traveling stability and steering feel can be improved without use of a steering sensor or an accelerator sensor.

The present embodiment may be modified such that a step for calculating the vehicle speed V of the four-wheel-drive vehicle 10B is inserted before S122 and before S124, and the slope of a mapping curve of each of the acceleration-mode map 36b and the reverse-rotation-mode map 36c (gain of the engagement force T extracted from the map) is controlled in accordance with the vehicle speed V. Thus, finer control is enabled. In this case, if the vehicle speed V is calculated on the basis of the input rotational speed N1, the vehicle speed V cannot be calculated accurately, due to spinning out of the front wheels FT1 and FT2. Therefore, the vehicle speed V is desirably calculated on the basis of the output rotational speed N2.

In the second embodiment, the engine 12 corresponds to the prime mover of the present invention; and the coupling 22 corresponds to the torque distribution clutch of the present invention. Further, S116 of the program executed by the CPU 34 serves as the first judgment unit of the present invention, S118 of the program serve as the second judgment unit of the present invention, and S122 of the program serve as the first setting unit of the present invention, S120 of the program serve as the second setting unit of the present invention, and S124 of the program serve as the third setting unit of the present invention.

Third Embodiment

Figure 10:
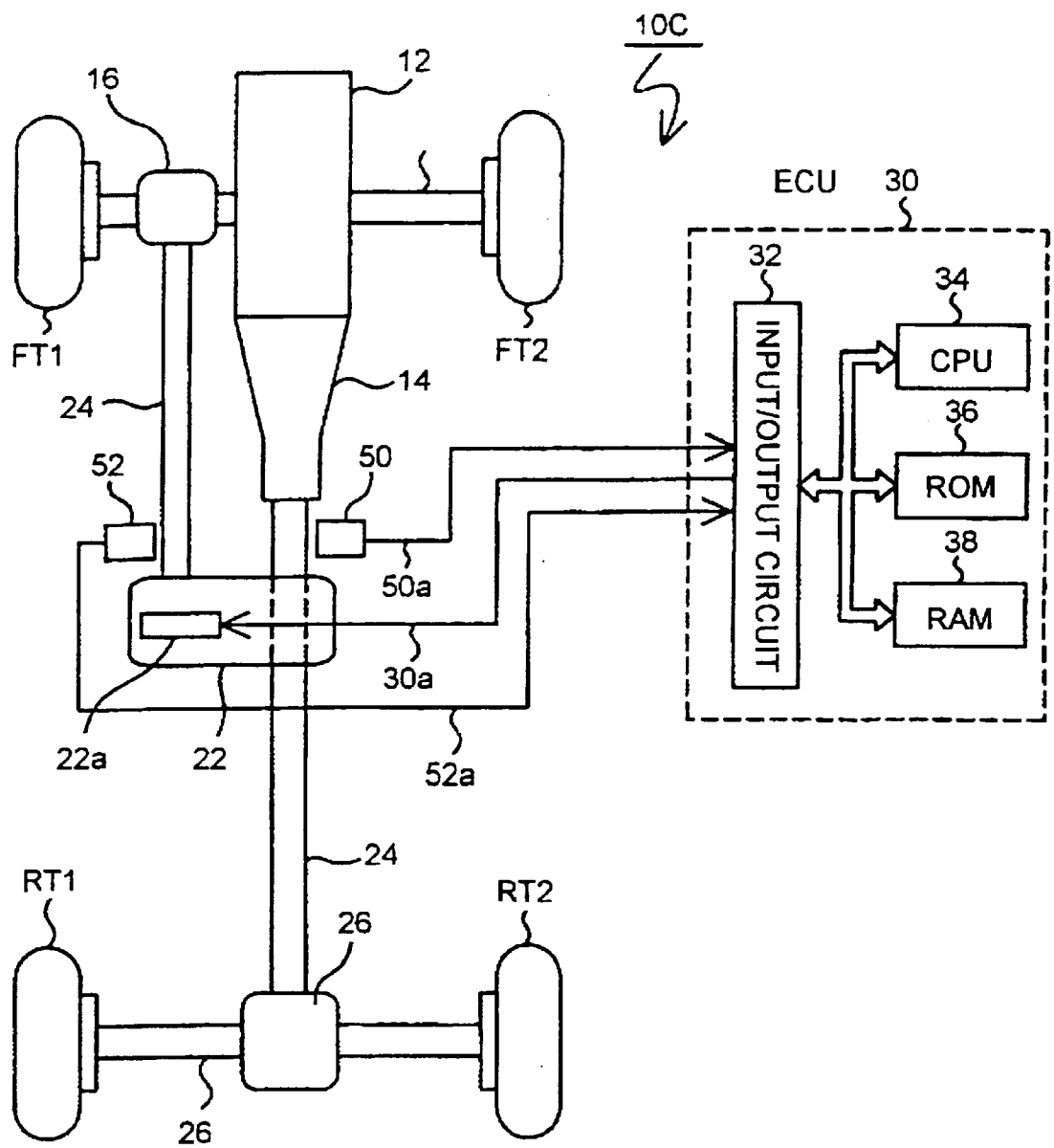
FIG. 10 is a diagram schematically showing the structure of a four-wheel-drive vehicle which is provided with a drive-force distribution controller according to a third embodiment of the present invention.
Figure 11A:
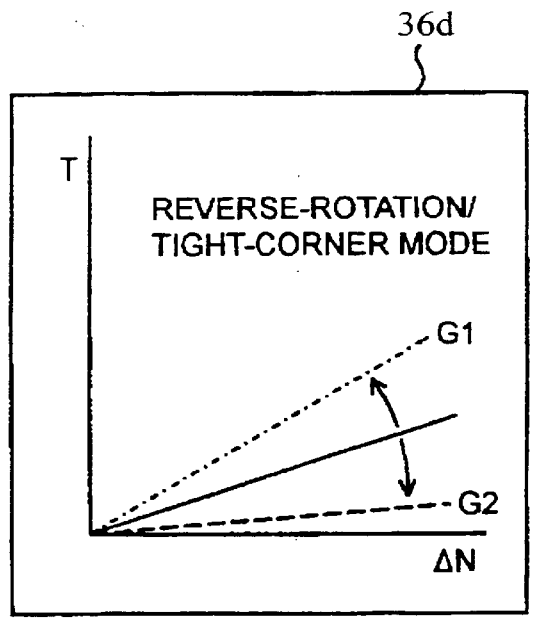
FIGS. 11A and 11B are graphs showing engagement-force control maps to which the CPU refers in order to control a coupling shown in FIG. 10.
Figure 11B:
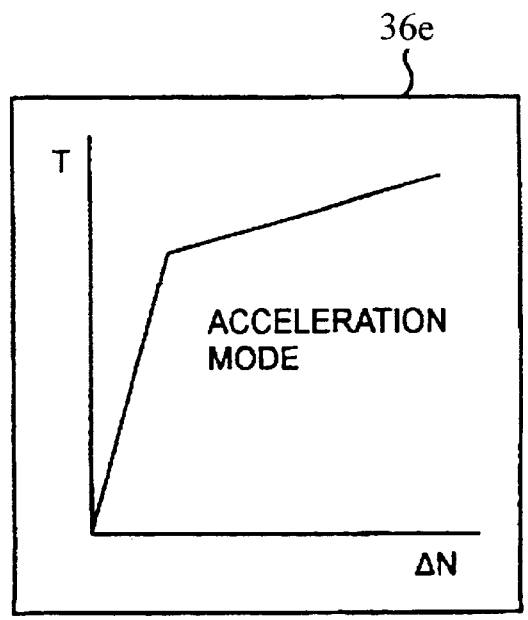
Figure 12:
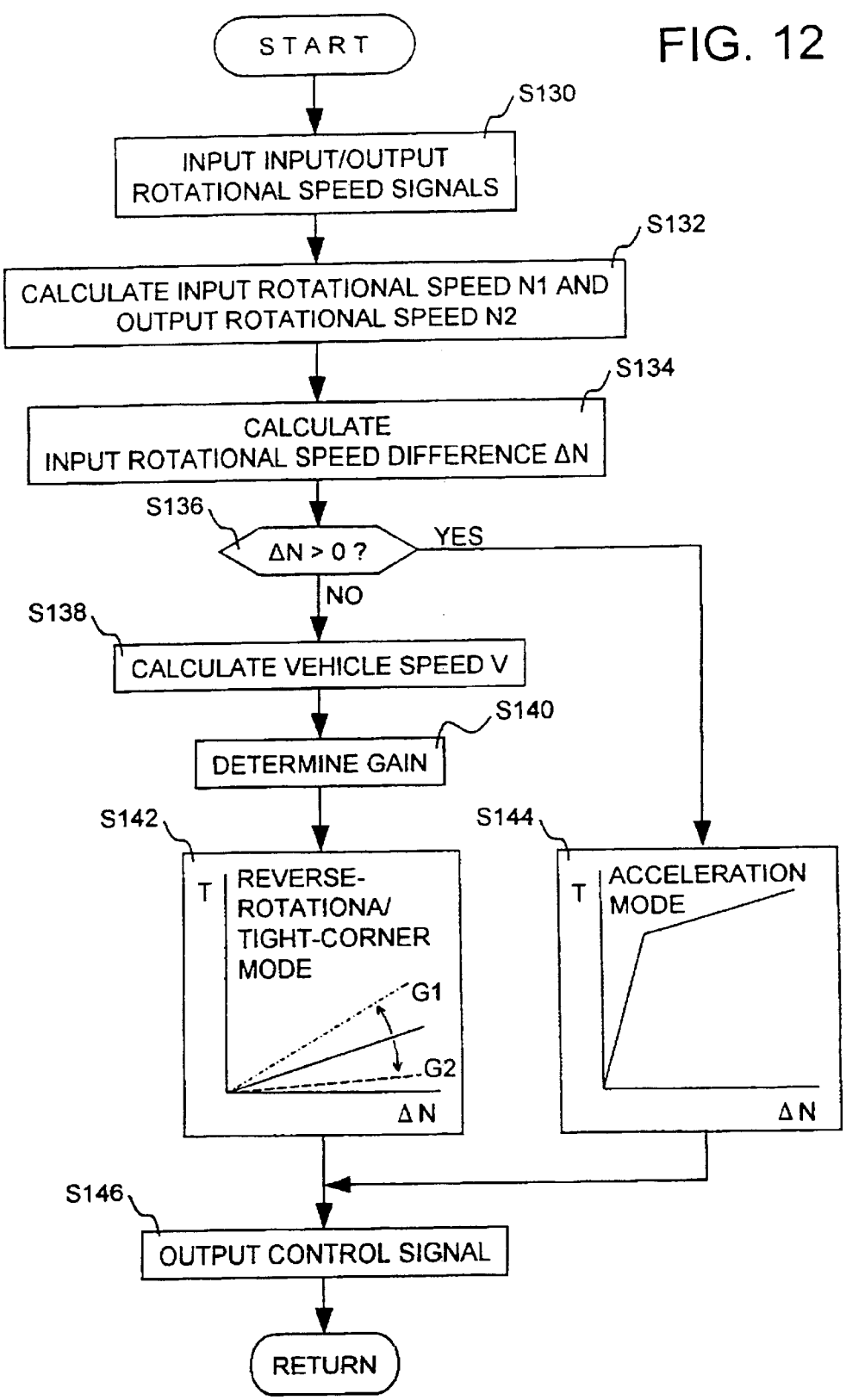
FIG. 12 is a flowchart showing the flow of processing which the CPU performs in order to control the engagement force of the coupling in the third embodiment.

FIG. 10 shows the structure of a four-wheel-drive vehicle 10C which is provided with a drive-force distribution controller according to a third embodiment of the present invention. FIGS. 11A and 11B are graphs showing engagement-force control maps to which the CPU 34 refers. FIG. 12 is a flowchart showing the flow of processing which the CPU 34 performs in order to control the engagement force T of the coupling 22.

The drive force distribution controller according to the present embodiment is adapted to control distribution of drive force in a four-wheel-drive vehicle which is designed on the basis of rear wheel drive.

In the following description, when the input rotational speed N1>the output rotational speed N2, the vehicle is considered to be in a forward-rotation mode, and when the input rotational speed N1<the output rotational speed N2, the vehicle is considered to be in a reverse-rotation mode. Further, portions which are the same as those in the second embodiment are denoted by the same reference numerals, and repeated descriptions are omitted.

As shown in FIG. 10, the first drive shaft 20 connected to the transmission 14 of the four-wheel-drive vehicle 10C is connected directly to the rear differential gear 26 and is connected to the second drive shaft 24 via the coupling 22. The second drive shaft 24 is connected to the front differential gear 16.

The engagement-force control maps stored in the ROM 36 include a reverse/tight-corner-mode map 36d shown in FIG. 11A and an acceleration-mode map 36e shown in FIG. 11B.

The reverse/tight-corner-mode map 36d is an engagement-force control map which is used when the four-wheel-drive vehicle 10C turns at low speed; e.g., when the vehicle 10C is turned around a tight corner, is being parked, or is put into a garage or when the vehicle 10C is decelerated by means of braking or engine brake. The slope of the mapping curve of the reverse/tight-corner-mode map 36d increases with vehicle speed V. That is, the gain of the engagement force T extracted from the reverse/tight-corner-mode map 36d increases with vehicle speed V. When the vehicle 10C turns at low speed; e.g., the vehicle 10C is turned around a tight corner, as indicated by G1 in FIG. 11A, the gain of the engagement force T is set to a low level, and when the vehicle 10C is decelerated, as indicated by G2 FIG. 11A, the gain of the engagement force T is set to a high level.

The acceleration-mode map 36e has the same characteristics as those of the acceleration-mode map 36a in the second embodiment.

Next, the flow of processing that the CPU 34 executes in order to control the engagement force T will be described with reference to the flowchart of FIG. 12.

The CPU 34 inputs the input rotational speed signal 50a output from the first sensor 50 and the output rotational speed signal 52a output from the second sensor 52 (S130). The CPU 34 then calculates the input rotational speed N1 on the basis of the input rotational speed signal 50a and calculates the output rotational speed N2 on the basis of the output rotational speed signal 52a (S132). Subsequently, the CPU 34 subtracts the output rotational speed N2 from the input rotational speed N1 to obtain the rotational speed difference ΔN (S134). Subsequently, the CPU 34 judges whether the rotational speed difference ΔN calculated in S134 is positive or negative; i.e., whether the vehicle is in the forward-rotation mode orthe reverse-rotation mode (S136). When the vehicle is in the reverse-rotation mode (S136:No), the CPU 35 calculates the vehicle speed V of the four-wheel-drive vehicle 10C on the basis of the output rotation speed N2 (S138) and determines a gain (S140). The reason why the vehicle speed V is calculated on the basis of the output rotational speed N2 is that in the four-wheel-drive vehicle 10C, which is designed on the basis of rear wheel drive, the rear wheels easily spin out at the time of acceleration or starting, and therefore, the vehicle speed V cannot be calculated accurately from the input rotational speed N1, which represents the rotational speed of the first drive shaft 20 connected directly to the rear wheel side.

Subsequently, while referring to the reverse/tight-corner-mode map 36d stored in the ROM 36, the CPU 34 extracts an engagement force T corresponding to the rotational speed difference ΔN calculated in S134 and multiplies the extracted engagement force T by the gain calculated in S140 (S142). Subsequently, the CPU 34 outputs to the coupling 22 a control signal 30a having a voltage value corresponding to the engagement force T multiplied by the gain (S146). When the vehicle speed V is low, e.g., at the time of tight-corner traveling, the ratio of increase in the engagement force T to increase in the rotational speed difference ΔN is set to a relatively small level, and the voltage of the control signal 30a output to the coupling 22 is relatively low.

Accordingly, the clutch disks of the electromagnetic clutch 22a engage with a relatively small engagement force, and thus a relatively small rotational torque is transmitted form the first drive shaft 20 to the second drive shaft 24, whereby the drive force of the front wheels FT1 and FT2 can be decreased.

Thus, the above-described tight-corner braking phenomenon —which would otherwise occur due to excess distribution of torque to the front wheels FT1 and FT2—can be prevented.

The drive force distribution control can be effected in such a manner that when the vehicle speed V is high, the ratio of increase in the engagement force T to increase in the rotational speed difference ΔN is an intermediate value which is larger than that during tight-corner traveling but smaller than that during acceleration. When the rotational speed of the rear wheels RT1 and RT2 decreases due to engine brake, the vehicle 10C is forced by inertia to continue its traveling, so that the rear wheels RT1 and RT2 easily slip and spin out. In view of this problem, drive torque is distributed to the front wheels FT1 and FT2. However, when an excessively large drive torque is supplied to the front wheels FT1 and FT2, steering stability deteriorates. Therefore, the engagement torque T is controlled to become greater than that during tight-corner traveling but smaller than that during acceleration.

That is, when the vehicle 10C is decelerated by means of braking or engine brake, a drive force corresponding to the degree of deceleration can be distributed to the front wheels. Therefore, slippage of wheels can be prevented to thereby enhance traveling stability.

In the case of a vehicle on which an anti-lock brake system (ABS) is mounted, in order to avoid interference with ABS control, a control program differing from the control program of the present invention is executed when the ABS system operates.

When the vehicle is in the forward-rotation mode; i.e., in the acceleration mode (S136:Yes), while referring to the acceleration-mode map 36e stored in the ROM 36, the CPU 34 extracts an engagement force T corresponding to the rotational speed difference ΔN calculated in S134 (S144). Subsequently, the CPU 34 outputs to the coupling 22 the control signal 30a having a voltage value corresponding to the engagement force T determined in S144 (S146). In this case, since the acceleration-mode map 36e is set such that the engagement force T increases sharply even when the rotational speed difference ΔN is small, the voltage of the control signal 30a output to the coupling 22 is relatively high.

Accordingly, the clutch disks of the electromagnetic clutch 22a engage with a relatively large engagement force, and thus a relatively large rotational torque is transmitted form the first drive shaft 20 to the second drive shaft 24, whereby the drive force of the front wheels FT1 and FT2 can be increased.

That is, since the ratio of distribution of torque to the front wheels FT1 and FT2 can be increased, stable acceleration or starting is effected, while slippage of the rear wheels RT1 and RT2 is prevented.

As described above, when the drive-force distribution controller for a four-wheel-drive vehicle according to the present embodiment is used, the engagement force of the torque distribution clutch can be controlled finely according to the traveling conditions of the four-wheel-drive vehicle 10C, by use of only the first and second sensors 40 and 42 for detection of rotational speed. Therefore, traveling stability and steering feel can be improved without use of a steering sensor or an accelerator sensor.

The present embodiment may be modified such that a step for calculating the vehicle speed V of the four-wheel-drive vehicle 10C is inserted before S144, and the slope of a mapping curve of the acceleration-mode map 36e (gain of the engagement force T extracted from the map) is controlled in accordance with the vehicle speed V. Thus, finer control is enabled.

When the drive-force distribution controller for a four-wheel-drive vehicle according to the second or third embodiment is applied to a vehicle equipped with ABS system, rotational speed difference $\Delta N$ may be calculated on the basis of the wheel speeds of the front and rear wheels which are obtained on the basis of signals output from wheel speed sensors provided for the front and rear wheels, respectively.

In the third embodiment the engine 12 corresponds to the prime mover of the present invention; and the coupling 22 corresponds to the torque distribution clutch of the present invention. Further, S136 of the program executed by the CPU 34 serves as the first judgment unit of the present invention, S144 of the program serve as the first setting unit of the present invention, and S142 of the program serve as the second setting unit of the present invention.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive-force distribution controller for a four-wheel-drive vehicle in which drive force produced by a prime mover is transmitted directly to front or rear wheels and is transmitted to the remaining wheels via a torque distribution clutch, and the engagement force of the torque distribution clutch is controlled in accordance with traveling conditions of the vehicle, the drive-force distribution controller comprising:
    a calculation unit for calculating variation per unit time in rotational speed difference between the front wheels and the rear wheels; and
    a control unit for controlling the engagement force such that the engagement force increases as the variation per unit time in the rotational speed difference increases.

2. A drive-force distribution controller for a four-wheel-drive vehicle according to claim 1, wherein the control unit controls the engagement force in accordance with the rotational speed difference, as well as the variation per unit time in the rotational speed difference.

3. A drive-force distribution controller for a four-wheel-drive vehicle according to claim 2, wherein the control unit comprises a control map for determining the engagement force in accordance with the rotational speed difference and variation per unit time in the rotational speed difference.

4. A drive-force distribution controller for a four-wheel-drive vehicle according to claim 1, wherein the drive force distribution controller further comprises a sensor for detecting the difference between rotational speed on the input side of the torque distribution clutch and rotational speed on the output side of the torque distribution clutch; and the calculation unit calculates variation per unit time in the rotational speed difference detected by the sensor.

5. A drive-force distribution controller for a four-wheel-drive vehicle according to claim 4, wherein the sensor comprises first and second annular members which are disposed to rotate together with one of input-side and output-side members of the torque distribution clutch and which are provided with sensing teeth formed on their outer circumferential surfaces at a predetermined pitch such that a phase difference is provided between the teeth of the first annular member and the teeth of the second annular member; and a pair of sensing heads disposed to rotate together with the other of the input-side and output-side members of the torque distribution clutch and to face the sensing teeth of the first annular member and the sensing teeth of the second annular member, respectively.

6. A drive-force distribution controller for a four-wheel-drive vehicle in which drive force produced by a prime mover is transmitted directly to front wheels and is transmitted to rear wheels via a torque distribution clutch, and the engagement force of the torque distribution clutch is controlled in accordance with traveling conditions of the vehicle, the drive-force distribution controller comprising:
    a first judgment unit for judging which is greater; the rotational speed of the front wheels or the rotational speed of the rear wheels;
    a second judgment unit which is enabled when the first judgment unit has judged that the rotational speed of the front wheels is greater than the rotational speed of the rear wheels, in order to judge whether the acceleration of the vehicle is greater than a predetermined level;
    a first setting unit for setting the engagement force to a relatively large first value when the second judgment unit has judged that the acceleration of the vehicle is greater than the predetermined level;
    a second setting unit for setting the engagement force to a second value smaller than the first value when the second judgment unit has judged that the acceleration of the vehicle is not greater than the predetermined level; and
    a third setting unit for setting the engagement force to a third value smaller than the first value but greater than the second value when the first judgment unit has judged that the rotational speed of the front wheels is less than the rotational speed of the rear wheels.

7. A drive-force distribution controller for a four-wheel-drive vehicle according to claim 6, wherein each of the first to third setting units sets the engagement force in consideration of the rotational speed difference between the front and rear wheels.

8. A drive-force distribution controller for a four-wheel-drive vehicle according to claim 7, wherein each of the first to third setting units sets the engagement force by use of a control map.

9. A drive force distribution controller for a four-wheel-drive vehicle in which drive force produced by a prime mover is transmitted directly to rear wheels and is transmitted to front wheels via a torque distribution clutch, and the engagement force of the torque distribution clutch is controlled in accordance with traveling conditions of the vehicle, the drive-force distribution controller comprising:
- a first judgment unit for judging which is greater; the rotational speed of the front wheels or the rotational speed of the rear wheels;
- a first setting unit for setting the engagement force to a relatively large first value when the first judgment unit has judged that the rotational speed of the front wheels is less than the rotational speed of the rear wheels; and
- a second setting unit for setting the engagement force to a second value smaller than the first value when the first judgment unit has judged that the rotational speed of the front wheels is greater than the rotational speed of the rear wheels, wherein the second value increases with the speed of the vehicle.

10. A drive-force distribution controller for a four-wheel-drive vehicle according to claim 9, wherein each of the first and second setting units sets the engagement force in consideration of the rotational speed difference between the front and rear wheels.

11. A drive-force distribution controller for a four-wheel-drive vehicle according to claim 10, wherein each of the first and second setting units sets the engagement force by use of a control map.

* * * * *

UNITED STATES PATENT AND TRADEMARK OFFICE
CERTIFICATE OF CORRECTION

PATENT NO. : 6,606,549 B1
DATED : Aug. 12, 2003
INVENTOR(S) : Murakami et al.

It is certified that error appears in the above-identified patent and that said Letters Patent is hereby corrected as shown below:

<u>Title page, Item [54] and Column 1, lines 1 and 2,</u>
Title, should read:
-- [54]  DRIVE-FORCE DISTRIBUTION CONTROLLER FOR A FOUR-WHEEL-DRIVE VEHICLE --

Signed and Sealed this

Twenty-third Day of March, 2004

JON W. DUDAS
*Acting Director of the United States Patent and Trademark Office*